United States Patent
Liang et al.

(10) Patent No.: US 10,298,974 B2
(45) Date of Patent: May 21, 2019

(54) METHOD AND DEVICE FOR PRESENTING CONTENT DATA FROM NETWORK

(71) Applicant: UC MOBILE CO., LTD., Beijing (CN)

(72) Inventors: Jie Liang, Beijing (CN); Fangxing Nie, Beijing (CN)

(73) Assignee: UC MOBILE CO., LTD., Beijing (CN)

( * ) Notice: Subject to any disclaimer, the term of this patent is extended or adjusted under 35 U.S.C. 154(b) by 0 days.

(21) Appl. No.: 15/328,639

(22) PCT Filed: Aug. 5, 2015

(86) PCT No.: PCT/CN2015/086149
§ 371 (c)(1),
(2) Date: Jan. 24, 2017

(87) PCT Pub. No.: WO2016/019875
PCT Pub. Date: Feb. 11, 2016

(65) Prior Publication Data
US 2017/0214948 A1    Jul. 27, 2017

(30) Foreign Application Priority Data
Aug. 5, 2014  (CN) .......................... 2014 1 0381941

(51) Int. Cl.
*H04N 21/462*    (2011.01)
*H04N 21/235*    (2011.01)
(Continued)

(52) U.S. Cl.
CPC ....... *H04N 21/2358* (2013.01); *H04N 21/218* (2013.01); *H04N 21/2181* (2013.01);
(Continued)

(58) Field of Classification Search
CPC ............ H04N 21/218; H04N 21/2181; H04N 21/222; H04N 21/23116; H04N 21/4622;
(Continued)

(56) References Cited

U.S. PATENT DOCUMENTS 7,660,815 B1 *  2/2010  Scofield ............ G06F 17/30702
707/999.102
9,386,352 B1 *  7/2016  Shoykhet ......... H04N 21/23439
(Continued)

FOREIGN PATENT DOCUMENTS

CN    101867780    10/2010
CN    103458305    12/2013

OTHER PUBLICATIONS

International Search Report and Written Opinion for corresponding International Application No. PCT/CN2015/086149, dated Oct. 29, 2015.
(Continued)

*Primary Examiner* — Robert J Hance
(74) *Attorney, Agent, or Firm* — Alston & Bird LLP (57) ABSTRACT

A method and device are disclosed for presenting content data (such as a video, an audio and a Flash) from a network. In content-related information (such as a webpage file) of related content data from a network, a plurality of content data sources are often provided for the same content. A weighted value is respectively set for each content data source based on the content-related information. Based on the weighted value of each content data source, a content data source is selected so as to present the content data. The weighted values can be set by considering various factors. In an embodiment, in consideration of different supporting capacities of a terminal system for different types of content data, the weighted values are set according to an MIME type of the content data sources.

15 Claims, 5 Drawing Sheets

(51) Int. Cl.

| | | |
|---|---|---|
| *H04N 21/218* | (2011.01) | |
| *H04N 21/24* | (2011.01) | |
| *H04N 21/222* | (2011.01) | |
| *H04N 21/231* | (2011.01) | |
| *H04N 21/8543* | (2011.01) | |
| *H04N 21/858* | (2011.01) | |
| *H04N 21/643* | (2011.01) | |

(52) U.S. Cl.
CPC ..... *H04N 21/222* (2013.01); *H04N 21/23116* (2013.01); *H04N 21/2404* (2013.01); *H04N 21/4622* (2013.01); *H04N 21/8543* (2013.01); *H04N 21/8586* (2013.01); *H04N 21/64322* (2013.01)

(58) Field of Classification Search
CPC ........... H04N 21/2404; H04N 21/2358; H04N 21/8543
See application file for complete search history.

(56) References Cited

U.S. PATENT DOCUMENTS

| | | | |
|---|---|---|---|
| 2002/0082730 A1 | 6/2002 | Capps et al. | |
| 2002/0165827 A1* | 11/2002 | Gien | G06F 21/645 705/64 |
| 2004/0024900 A1* | 2/2004 | Breiter | H04L 29/06027 709/231 |
| 2004/0064500 A1* | 4/2004 | Kolar | G06F 17/30858 709/202 |
| 2008/0228821 A1* | 9/2008 | Mick | G06F 21/10 |
| 2009/0150832 A1* | 6/2009 | Keller | G06F 17/30958 715/854 |
| 2011/0161843 A1* | 6/2011 | Bennett | G06F 3/14 715/760 |
| 2014/0006392 A1 | 1/2014 | Ong et al. | |
| 2014/0186001 A1* | 7/2014 | Aldrey | G06F 13/38 386/200 |
| 2015/0256600 A1* | 9/2015 | Dakhane | H04L 67/10 709/203 |
| 2017/0238030 A1* | 8/2017 | Ziskind | H04N 21/4331 380/205 |

OTHER PUBLICATIONS

Office Action for corresponding Chinese Application No. 201410381941.4 dated Feb. 24, 2016.

* cited by examiner

METHOD AND DEVICE FOR PRESENTING CONTENT DATA FROM NETWORK

CROSS-REFERENCE TO RELATED APPLICATION

The present invention claims priority to and the benefit of PCT/CN2015/086149, filed Aug. 5, 2015, which claims priority and the benefit of the Chinese Patent Application No. 201410381941.4, which was filed with the State Intellectual Property Office (SIPO) of the People's Republic of China on Aug. 5, 2014, and entitled "Method and device for presenting content data from network,"the entire contents of which are incorporated by reference to the present application.

TECHNICAL FIELD

The present invention relates to the technical field of Internet; and particularly to a method and device for presenting content data from network.

BACKGROUND ART

When a user is using the Internet, the content data from networks frequently need to be presented for the user. For example, a user may need to play a video, audio or flasher (Flash) and the like.

For the currently available Hypertext Markup Language (HTML) 5 standards, in order to solve the problem of failure in video playing resulting from the issue that different browsers have different supporting capacities for various video formats, a <source> tag has been added to the <video> tag, which allows to designate a plurality of video sources. In this way, a browser is allowed to selected one of the video source to play the video based on its own supporting capacity. It is shown as follows:

```
<video controls>
    <source src="video1.mp4"/>
    <source src="video1.ogv"/>
    <source src="video1.webm"/>
</video>
```

However, the current mainstream browsers, during execution, always choose the video source referred to by the first <source> tag to play the video as default, without considering the supporting capacity of the specific player of the terminal (such as a smartphone or computer) system to different video formats.

On the other hand, web developers do not consider how to handle the situation when a terminal is unable to play a video.

Due to the fact that there are many different systems for the terminals (such as a smartphone or computer), in practice, a user may frequently encounter the situation that the format of the first video source is not supported by the player of a terminal system, which will result in a failure in playing, and accordingly, a poor user experience.

For audio, Flash and other type of content data, the same problem does exist as well.

The foregoing concerns the supporting capacity of a browser to content data.

On the other hand, in the case when a number of different content data sources are located on different websites, it is possible that the content data source ranking in the front may correspond to a relatively slow network access speed.

Alternatively, in the case when a number of different content data sources have different byte counts, it is possible that the first content data source may represent a relatively large data flow.

In the situations mentioned above, according to the conventional method, it may simply use the first content source to present the content data, though it may not be the best way of presenting the content data.

It is therefore desirable to have a method or device that is able to select a suitable content data source among a plurality of different content data sources.

SUMMARY OF THE INVENTION

The present invention intends to solve the technical problem of providing a method and device for presenting content data from a network, which is able to select a suitable content data source among a plurality of different content data sources.

According to the first aspect of the present invention, the present invention provides a method for presenting content data from a network. In content-related information of related content data from a network, a plurality of content data sources is often provided for the same content. The method comprises a weighted value is respectively set for each content data source based on the content-related information; and based on the weighted value of each content data source, a content data source is selected, so as to present the content data.

Preferably, based on the content-related information, respectively determine the Multipurpose Internet Mail Extensions (MIME) type for each of the plurality of content data sources; and then based on the MIME type of each content data source, look for the corresponding weighted values from a pre-set table of weighted values.

Preferably, the step of respectively determining the MIME type for each of the plurality of content data sources comprises: in the case when the MIME type of the content data source has been provided in the content-related information, extract the MIME type of the content data source from the content-related information; while in the case when the MIME type of the content data source has not been provided in the content-related information, determine the MIME type of the content data source based on the Uniform Resource Locator (URL) of the content data source provided in the content-related information.

Preferably, the step of determining the MIME type of the content data source based on the URL of the content data source comprises: in the case when the URL is a data type URL, extract the MIME type from the URL; while in the case when the URL is not a data type URL, on the basis of the filename extension contained in the URL, determine the MIME type of the content data source according to a table of corresponding relationship between filename extension and MIME type.

Preferably, select the content data source with the highest weight value among the plurality of content data sources to present the content data, and in the case when an error occurs during presenting the content data, select the content data source with the highest weight value among the content data sources free of error to present the content data.

Preferably, in the case when an error occurs during presenting the content data, record the time point of content data presenting while the error occurs; and when using a newly selected content data source to present the content data, jump to the recorded time point to continue presenting the content data.

According to another aspect of the present invention, the present invention provides a device for presenting content data from a network. In content-related information of related content data from a network, a plurality of content data sources is often provided for the same content. The device comprises: a weighted value setting means, which is used for respectively setting a weighted value for each content data source based on the content-related information; and a content data source selecting means, which is used for based on the weighted values of the plurality of content data sources, selecting a content data source to present the content data.

Preferably, the device further comprises: an MIME type determining means, which is used for based on the content-related information, respectively determining the MIME type for each of the plurality of content data sources; and then based on the Multipurpose Internet Mail Extensions (MIME) type of each content data source, the weighted value setting means looks for the corresponding weighted values from a pre-set table of weighted values.

Preferably, the MIME type determining means comprises: a first extracting means, which is used for when the MIME type of the content data source has been provided in the content-related information, extracting the MIME type of the content data source from the content-related information; and/or a URL analysis means, which is used for when the MIME type of the content data source has not been provided in the content-related information, determine the MIME type of the content data source based on the Uniform Resource Locator (URL) of the content data source provided in the content-related information.

Preferably, the URL analysis means comprises: a second extracting means, which is used for, in the case when the URL is a data type URL, extracting the MIME type from the URL; and/or an extension analysis means, which is used for, in the case when the URL is not a data type URL, on the basis of the filename extension contained in the URL, determining the MIME type of the content data source according to a table of corresponding relationship between filename extension and MIME type.

Preferably, the content data source selecting means selects the content data source with the highest weight value among the plurality of content data sources to present the content data, and in the case when an error occurs during presenting the content data, the content data source selecting means selects the content data source with the highest weight value among the content data sources free of error to present the content data.

By means of the method and device for presenting content data from a network provided in the present invention, the present invention is able to appropriately select a suitable content data source among a plurality of content data sources according to the actual situation, so as to help users to make a better use of the resources available on the Internet.

DESCRIPTION OF THE EMBODIMENTS

The method and device for presenting content data from a network according to the present invention will be further described in details in reference to FIGS. 1 to 10.

When a user is using a smartphone or other mobile communication terminal, or using a computer terminal to browse the Internet, such as visiting a website or using certain applications, the content data from networks frequently need to be presented for the user. For example, a user may need to play a video, audio or flasher (Flash) and the like. These content data may be located on the website that the user is visiting, or located on other websites.

The browser or other application programs are able to obtain the content-related information of related content data from the visited websites. When using a browser to visit a website, the above-mentioned content-related information may be a webpage file or a portion of the webpage file; in particular, it may be an HTML webpage file. In addition, when other applications are used to visit the content data from a network, they will obtain the content-related information in corresponding format of related content data from the visited network as well.

As mentioned above, on some websites, a plurality of different content data sources (video sources) have been provided for the same content, for example, a video.

In such a case, the information about the plurality of different content data sources will be provided in the content-related information, such as the location of the content data sources, their respective file names and so on.

For example, as mentioned previously, based on the current HTML5 standards, in the HTML webpage file, a <source> tag may be added to the <video> tag, which provides the information about a plurality of video sources.

A website may provide a plurality of content sources. However, the website does not know what type of content data (such as a video) a terminal may need. As a result, the terminal needs to select a suitable content data source by itself (such as a video source).

A terminal may make the selection based on its own supporting capacity; alternatively, a terminal may make the selection based on network access speed, or make the selection based on data flow.

First, in reference to FIGS. 1 to 5, the embodiments of the method for presenting content data from a network according to the present invention will be described in detail.

Figure 1:
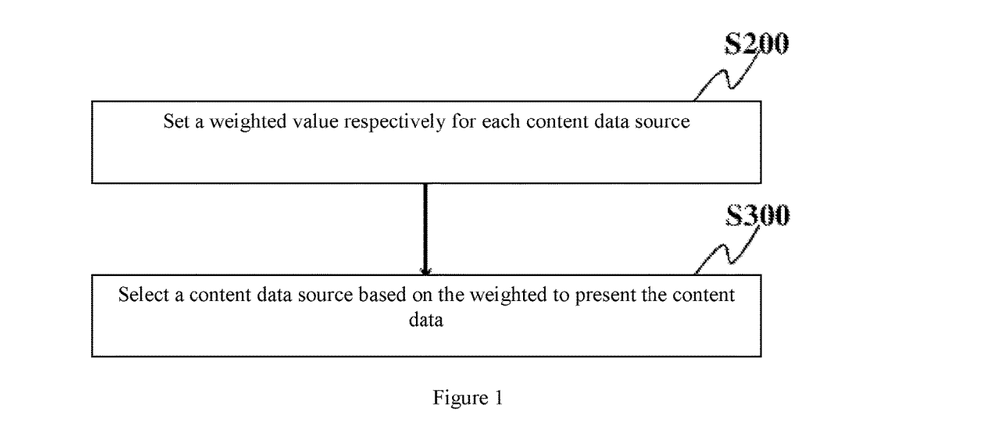
FIG. 1 is a schematic flow chart of the method for presenting content data from a network according to one embodiment of the present invention.

FIG. 1 is a schematic flow chart of the method for presenting content data from a network according to one embodiment of the present invention.

As shown in FIG. 1, in the method for presenting content data from a network according to the present invention, a step S200 is firstly performed, which includes a weighted value, is respectively set for each content data source based on the content-related information.

A number of factors may be considered when setting the weighted value.

For example, in the case when concerning the supporting capacity for various content data by the terminal for presenting the content data, the weighted value may be set based on the supporting capacity for various content data by the terminal for presenting the content data. For example, the content data source that has a better system support may be set with a higher weighted value.

Alternatively, in the case when concerning the network access speed, when the content data sources of the plurality of different content data sources are located on different websites, the weighted values may be set based on the specific access speeds of the content data sources. For example, the content data source that has a faster access speed may be set with a higher weighted value.

Alternatively, in the case when concerning the data flow, the weighted values may be set based on the content data byte counts of the content data sources. For example, the content data source that has a lower byte counts may be set with a higher weighted value.

Subsequently, perform the step S300, which includes based on the weighted value of each content data source, a content data source is selected, so as to present the content data.

In general, the content data source with the highest weighted value among the plurality of content data sources may be selected to present the content data. In such case, as mentioned above, it may select the content data source that has the best system support, the content data source that has the fastest access speed, or the content data source that has the lowest byte counts.

Moreover, in the case when an error occurs during presenting the content data, select the content data source with the highest weight value among the content data sources five of error to present the content data.

In the case when concerning the supporting capacity for various content data by the system of the terminal for presenting the content data, in the step S300, the weighted value may be set based on the Multipurpose Internet Mail Extensions (MIME) type of the content data source.

With the information of MIME type of a content data source, a system is able to learn which program may be used to present the content data from that content data source. In addition, in combination with the specific situation of the system, the support capacity of the system to that content data source could be known.

In light of the foregoing, a table of weighted value can be pre-set, in which the corresponding weight value for the content data source of each specific MIME type could be provided. In the step S200, the MIME type of content data source may be used as an index to search the table of weighted value, so as to obtain the specific weighted value corresponding to each content data source. Next, the content data source with the highest weighted value can be selected.

Two tables of weighted value may be pre-set; one is a table of weighted value for general purpose, while the other one is a table of weighted value for a specific operation system. For example, in the case when the terminal is a smartphone, it may be a table of weighted value for Android, table of weighted value for iOS system, or table of weighted value for MS windows system.

In the case when two tables of weighted value are pre-set, the table of weighted value for general purpose may be searched first; and if the weighted value for the MIME type cannot be found, then the table of weighted value for the specific operation system will be searched.

Figure 2:
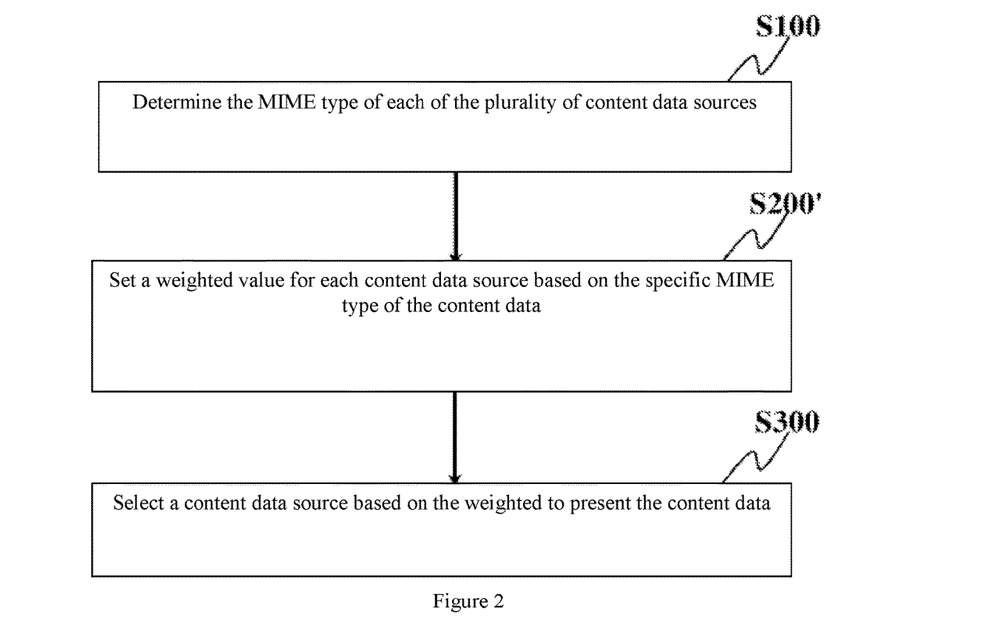
FIG. 2 is a schematic flow chart of the method for presenting content data from a network according to another embodiment of the present invention.

FIG. 2 is a schematic flow chart of the method for presenting content data from a network according to another embodiment of the present invention.

In the flow chart shown in FIG. 2, a step S100 is added to the step S200' that is corresponding to the step S200 shown in FIG. 1.

In the step S100, based on the above-mentioned content-related information (such as a webpage file or a portion of a webpage file), the specific MIME type of the plurality of content data sources are firstly determined.

In the step S200', a weighted value is respectively set for each content data source based on the specific MIME type of the content data. For example, as mentioned previously, the MIME type could be found by searching the pre-set table of weighted value, and then the found corresponding weighted value is used as the weighted value of the content data source.

Subsequently, in the step S300, based on the weighted value of each content data source, a content data source is selected, so as to present the content data.

Figure 3:
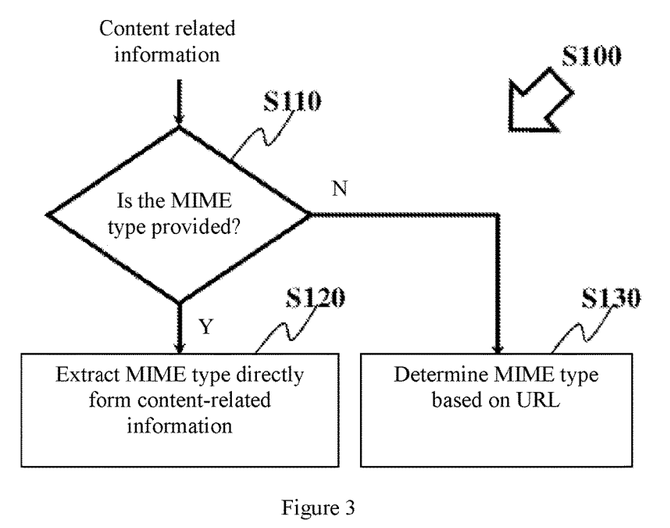
FIG. 3 is a flow chart of one method for determining the MIME type.

FIG. 3 has shown a method for determining the MIME type of a content data source in the step S100.

As mentioned above, when visiting a website, the content-related information of related content data can be obtained from the visited website. In addition, the content-related information may be the entire webpage file, or a portion of the webpage file.

First, in the step S110, it may search the content-related information to find if the MIME type information of each content data source is already provided in the content-related information.

In general, most of the formal websites, such as video websites, will provide the information of the MIME type of each content data source, such as video source, in their webpage files, for the user's reference.

In the step of S110, when a search has found that the information of the MIME type of each content data source has been provided in the content-related information, then in the step S120, the MIME type of the content data source can be extracted from the content-related information.

However, in the step S110, in the case when the search has found that the information of the MIME type of each content data source has not been provided in the content-related information, then in the step S130, the MIME type of the content data source may be determined by way of try to extract the URL of the content data source rom the content-related information.

Figure 4:
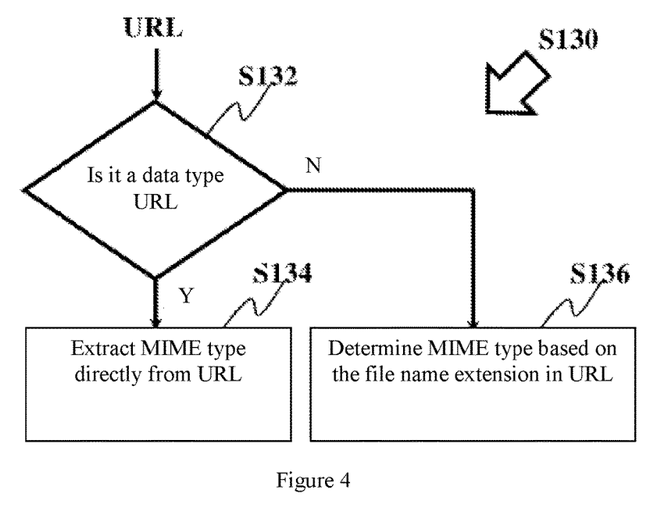
FIG. 4 is a flow chart of one method for determining the MIME type based on URL.

FIG. 4 is a flow chart of one method for determining the MIME type based on URL in the step S130.

In order to present the content data from a network, the URL information of the content data sources will be provided in the content-related information. Therefore, it is possible to determine the MIME type of the content data sources from the information in URL.

First, in the step S132, determine whether the URL is a data type URL.

The so called data type URL is proposed in RF2397, for those small sized content data, the content data may be directly embedded in a webpage, without the need of being loaded from an external file.

In the data type URL, it will usually provide the MIME type of the content data, which can facilitate presenting the content data in a browser or other applications.

In the case when in the step S132, it has been determined that the URL is a data type URL; then in the step S134, the MIME type can be directly extracted from the URL.

However, in the case when in the step S132, it has been determined that the URL is a data type URL; then in the step S134, based on the file name extension provided in the URL, according to the corresponding relationship between the file name extension and the MIME type, determine the MIME type of the content data source.

In a terminal system, such as during a system initialization, typically a table of corresponding relationship between file name extension and MIME type will be provided, which can help to open files of different formats.

Accordingly, extract the file name extension from the URL, and then find the corresponding MIME type from the foregoing table of corresponding relationship, so as to obtain the MIME type of the content data source.

Thus, in reference to FIGS. 3 and 4, a few methods for determining the MIME type of the content data source have been described.

It should be understood that the present invention can use a combination of the methods described above for determining the MIME type, or it may use only one or a combination of a few among the methods described above for determining the MIME type.

In addition, it should be understood that a person of ordinary skill in the art may use other method or a combination of other method(s) and the method described herein for determining the MIME type; and those methods are applicable in the present invention as well.

In the case when each of the method for determining the MIME type has been tried while the MIME type still cannot be determined, for example, the content-related information does not provide MIME type, and does not provide file name extension either, in addition it is not a data type URL, or in the table of the corresponding relationship between file name extension and MIME type in the system does not include this specific file name extension, it is unable to set a weighted value based on MIME type. In such case, the weighted value of this content data source may be set with a lowest value, for example-1.

Moreover, when the table of weighted value does not include the weighted value for a specific MIME type, the weighted value of this content data source may be set with a lowest value, for example-1.

In the case when the corresponding weighted values of the plurality of content data sources have not been provided in the content data source, such as webpage file, the traditional approach has to be adopted, that is to say, first try the first content data source, if fails, then it is over.

The method for presenting content data from a network according to another embodiment of the present invention has been described above in detail.

In this embodiment, considering the supporting capacity of the system of a terminal to various types of content data, the MIME type of each content data source is determined based on the content-related information, and then based on the MIME type of each content data source to set a corresponding weighted value for each content data source; accordingly, to a certain extent the corresponding weighted value is able to reflect the supporting capacity from the terminal system to that content data. Therefore, select the content data source based on corresponding weighted value can better match the supporting capacity from the terminal system to that content data.

Next, in reference to FIG. 5, a method for handling a situation in which an error occurs when presenting the content data from a content data source will be described.

When presenting content data, all of the content data sources and corresponding, weighted values can be sent together to the application layer. The application layer is a Java code, which is able to monitor the error message generated during the process of presenting the content data through the application programming interface (API) of the terminal system (such as Android. system).

In the case when due to certain content data format supporting problem, network problem, server problem and the like, the selected content data source cannot be played, the application layer will receive an error message sent back from the terminal system (such as Android system). At this moment, the application layer may record the time point for playing the current content data, select another content data source that has the second highest weighted value among the remaining content data sources and then assign it to the application program, such as a media player, used for playing the content data, so as to present the content data from the new content data source; in addition it is able to automatically jump to the time point when the previous error occurred to continue presenting the content data. In the case when the newly selected content data source fails again, a new error message will be received, and then it will try to select the content data source with further lower weighted value. Until all of the available content data sources have been tried and none of them can play the content data, the user will be informed about unable to play the content data.

Figure 5:
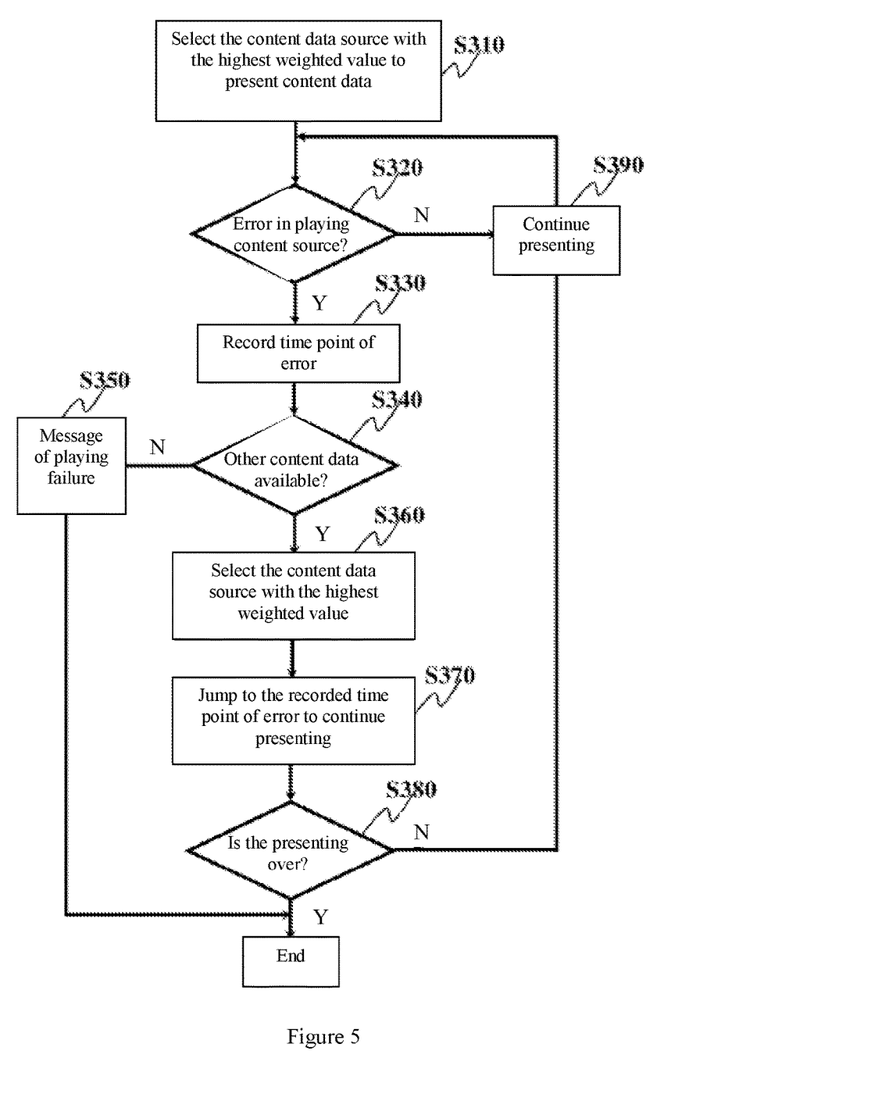
FIG. 5 is a flow chart of one method for selecting and then playing content data.

FIG. 5 is a flow chart of one method for selecting and then playing content data.

First, as mentioned above, in the step S310, select the content data source with the highest weight value among the plurality of content data sources to present the content data.

Next, in the step S320, determine whether an error occurs during presenting the content data, for example, an error may occur due to certain content data format supporting problem, network problem, server problem and the like.

In the case when it has been determined in the step S320 that no error occurs during presenting the content data, in the step S390 continue presenting the content data, and then return to the step S320 to continue monitoring whether an error occurs.

In the case when it has been determined in the step S320 that an error occurs during presenting the content data, in the step S330, record the time point of content data presenting when the error occurs, for examples, the time point of playing a video, audio or Flash.

Next, in the step S340, determine whether there is another content data source that does not have an error.

In the case when it has been determined in the step S340 that there is no other content data source that does not have an error, in other words, all of the content data sources have been tried and they all have errors, in the step S350, send a message to the user to tell that the content data cannot be properly presented, and then the process of presenting the content data is over.

In the case when it has been determined in the step S340 that there is another content data source that does not have an error, in other words, there is still at least one content data source that has not been tried, in the step S360, select the content data source with the highest weight value among the content data sources have not been tried to present the content data.

In the step S370, when using the newly selected content data source to present the content data, jump to the recorded time point of error and then continue presenting the content data from the time point of error.

In the step S380, determine whether the process of presenting the content data is over. In the case when it is not over, go to step S390 to continue presenting the content data, and monitor whether an error occurs in the step S320.

In the case when it is determined that the entire process for presenting the content data is over, the process for presenting the content data is over.

By way of selecting a content data source with a lower weighted value when a selected content data source has an error, the present invention is able to take full advantages of the resources provided by the website By way of recording the time point of error when an error occurs and then directly jumping to the time point of error when another content data source is used to present the content data, the present invention allows a user to enjoy the content data more conveniently. Without any operation, a user is allowed to view the entire content data smoothly without determining how long the content data have already been presented.

Next, in reference to FIGS. 6 to 10, the embodiments of the device for presenting content data from a network according to the present invention will be further described in detail.

In the devices shown in FIGS. 6 to 10, the specific operations for the devices are the same or similar to the operating steps in the embodiments of the methods described above in reference to FIGS. 1 to 5. Therefore, the details for the same or similar steps will not be repeated here again.

Figure 6:
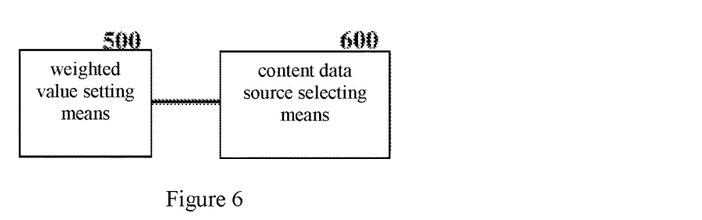
FIG. 6 is a schematic block diagram of the device for presenting content data from a network according to one embodiment of the present invention.

FIG. 6 is a schematic block diagram of the device for presenting content data from a network according to one embodiment of the present invention.

As shown in FIG. 6, the device in this embodiment for presenting content data from a network may comprises a weighted value setting means 500 and a content data source selecting means 600.

The weighted value setting means 500 is used for respectively setting a weighted value for each content data source based on the content-related information.

As mentioned previously, a variety of different factors may be considered when the weighted value setting means 500 setting the weighted value.

For example, in the case when concerning the supporting capacity for various content data by the terminal for presenting the content data, the weighted value may be set based on the supporting capacity for various content data by the terminal for presenting the content data. For example, the content data source that has a better system support may be set with a higher weighted value.

Alternatively, in the case when concerning the network access speed, when the content data sources of the plurality of different content data sources are located on different websites, the weighted values may be set based on the specific access speeds of the content data sources. For example, the content data source that has a faster access speed may be set with a higher weighted value.

Alternatively, in the case when concerning the data flow, the weighted values may be set based on the content data byte counts of the content data sources. For example, the content data source that has a lower byte counts may be set with a higher weighted value.

The content data source selecting means 600 is used for based on the weighted values of the plurality of content data sources, selecting a content data source to present the content data.

In general, the content data source with the highest weighted value among the plurality of content data sources may be selected by the content data source selecting means 600 to present the content data. In such case, as mentioned above, it may select the content data source that has the best system support, the content data source that has the fastest access speed, or the content data source that has the lowest byte counts.

Moreover, in the case when an error occurs during presenting the content data, select the content data source with the highest weight value among the content data sources free of error to present the content data.

In light of the foregoing, it could be known that the method for presenting content data from a network shown in this embodiment of the present invention is able to appropriately select the suitable content data source according to actual situation.

Figure 7:
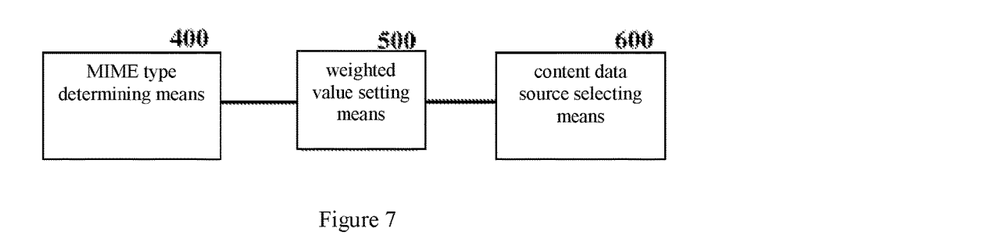
FIG. 7 is a schematic block diagram of the device for presenting content data from a network according to another embodiment of the present invention.

FIG. 7 is a schematic block diagram of the device for presenting content data from a network according to another embodiment of the present invention.

As shown in FIG. 7, the device for presenting content data from a network according to another embodiment of the present invention may comprises an MIME type determining means 400, a weighted value setting means 500 and a content data source selecting means 600.

The MIME type determining means 400 is used for according to the content-related information, respectively determining the MIME type for each of the plurality of content data sources.

The weighted value setting means 500 is used for based on the Multipurpose Internet Mail Extensions (MIME) type, finding the corresponding weighted value from the pre-set table of weighted value.

Next, the content data source selecting means 600 is used for selecting the content data source according to the weighted values of the plurality of content data sources to present the content data.

Figure 8:
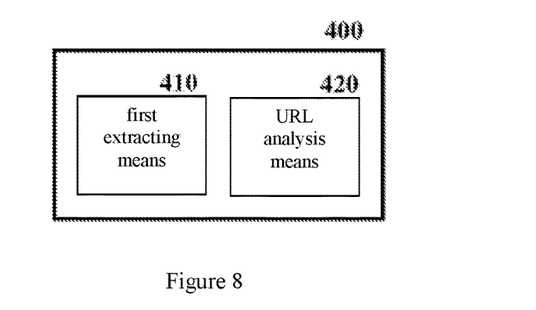
FIG. 8 is a schematic block diagram of one implementation method for the MIME type determining means.

FIG. 8 is a schematic block diagram of one implementation method for the MIME type determining means 400.

As shown in FIG. 8, the MIME type determining means 400 may comprise a first extracting means 410 and a URL analysis means 420.

The first extracting means 410 is used for when the MIME type of the content data source has been provided in the content-related information, extracting the MIME type of the content data source from the content-related information.

The URL analysis means 420 is used for when the MIME type of the content data source has not been provided in the content-related information, determine the MIME type of the content data source based on the Uniform Resource Locator (URL) of the content data source provided in the content-related information.

It has been shown in FIG. 8 that the MIME type determining means 400 comprises a first extracting means 410 and a URL analysis means 420. However, it should be understood that the MIME type determining means 400 may contain only one of the first extracting means 410 and the URL analysis means 420. That is to say, the MIME type is determined by only one of the approach.

Figure 9:
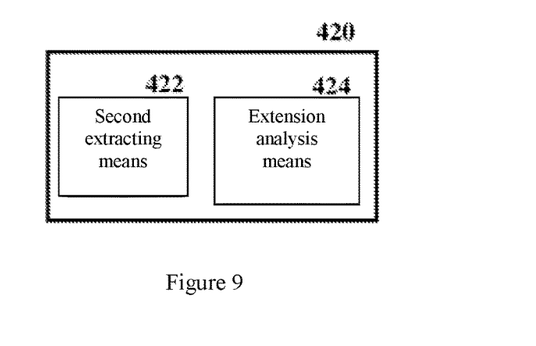
FIG. 9 is a schematic block diagram of one implementation method for the URL analysis means.

FIG. 9 is a schematic block diagram of one implementation method for the URL analysis means 420.

As shown in FIG. 9, the URL analysis means 420 may comprises a second extracting means 422 and an extension analysis means 424.

The second extracting means 422 is used for, in the case when the URL is a data type URL, directly extracting the MIME type from the URL.

The extension analysis means 424 is used for, in the case when the URL is not a data type URL, on the basis of the filename extension contained in the URL, determining the MIME type of the content data source according to a table of corresponding relationship between filename extension and MIME type.

It has been shown in FIG. 9 that the URL analysis means 420 comprises a second extracting means 422 and an extension analysis means 424. However, it should be understood that the URL analysis means 420 may contain only one of the second extracting means 422 and the extension analysis means 424. That is to say, the MIME type is determined by only one of the approach.

The device for presenting content data from a network according to another embodiment of the present invention has been described above in detail.

In this embodiment, considering the supporting capacity of the system of a terminal to various types of content data, the MIME type of each content data source is determined based on the content-related information, and then based on the MIME type of each content data source to set a corresponding weighted value for each content data source; accordingly, to a certain extent the corresponding weighted value is able to reflect the supporting capacity from the terminal system to that content data. Therefore, select the content data source based on corresponding weighted value can better match the supporting capacity from the terminal system to that content data.

Figure 10:
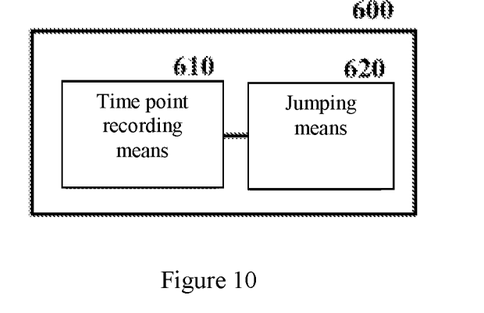
FIG. 10 is a schematic block diagram of one implementation method for content data selecting means.

FIG. 10 is a schematic block diagram of one implementation method for content data selecting means.

The focus here is to describe the module that is needed when an error occurs during presenting the content data. Accordingly, the module related to selecting the content data source and the module related to presenting the content data will not be described.

As shown in FIG. 10, the content data source selecting means 600 may further comprise a time point recording means 610 and a jumping means 620.

It has been shown in FIG. 10 that the time point recording means 610 and the jumping means 620 are included in the content data source selecting means 600. However, a person of ordinary skill in the art can understand that the content data source selecting means 600 can be achieved beyond the content data source selecting means 600.

The time point recording means 610 is used for recording the time point of content data presenting when an error occurs when an error occurs during the process for presenting the content data.

The jumping means 620 is for jumping to the recorded time point to continue presenting the content data when a newly selected content data source is used to present the content data.

The specific operation for the case when an error occurs during present content data in this case is the same as the process shown in the flow chart of FIG. 5, and thus will not be repeated again here.

By way of selecting a content data source with a lower weighted value when a selected content data source has an error, the present invention is able to take full advantages of the resources provided by the website By way of recording the time point of error when an error occurs and then directly jumping to the time point of error when another content data source is used to present the content data, the present invention allows a user to enjoy the content data more conveniently. Without any operation, a user is allowed to view the entire content data smoothly without determining how long the content data have already been presented.

Next, an application example of the method provided in the present invention will be describe briefly, for the purpose of allowing people to more clearly understand the inventive idea of the present invention.

For example, the webpage file (in other words, the content-related information) of a webpage contains the code as follows:

```
<video controls>
    <source src="video1.mp4"/>
    <source src="video1.ogv"/>
    <source src="video1.webm"/>
</video>
```

In this case, three video sources (content data source) have been provided for the same video content.

As shown above, the webpage does not set the MIME type; in addition, the URL of the video source is not the data type URL, either. However, the video source address URL contains file name and file name extension. As a result, based on the file name extension, by way of searching the table of corresponding relationship between file name extension and MIME type (the table of corresponding relationship has been pre-set), the MIME type for each of the three video sources can be obtained. Next, based on the obtained MIME type, the corresponding weighted value for each of the video sources can be obtained from a table of weighted value.

As an example, a normal player usually has a better compatibility with mp4 than its compatibilities with the video in other formats. As a result, in the table of weighted value, video.mp4 has the highest corresponding weighted value, the second one of video.ogv, while video.webm has the lowest corresponding weighted value.

In this example, although the mp4 file is located in the middle rather than on the top, the video.mp4 file that has the best support from the browser is still selected. This can help to improve the playing success rate.

Suppose that the video.mp4 file is corrupted. Accordingly, when it is played by a media player, an error message will appear. The application layer that is monitoring will receive this error message and then check the remaining two video sources. It will found that video.ogv has the highest weighted value among them. As a result, it will record current playing time point and switch the video source to video.ogv. In addition, by way of a seek operation, it can continue playing the video from the time point when the error occurs. In this case, the user can only feel that the video playing has a short pause or buffering, and then it will resume to normal playing again; the user will not even know that an error occurred during the video playing process.

In the case when the video.ogv is corrupted as well, it will check the last remaining video source, and then play the video.webm.

However, if the video.webm has an error as well, the playing cannot continue anymore. In such case, the user will receive an error message.

So far, the specific exemplary embodiments of the method and device for presenting content data from a network provided in the present invention have been described in details. However, those skilled in the art would understand that the present invention is not limited to the various detailed descriptions provided herein, which may be suitably changed. The scope of the invention should be defined by the appended claims.

What is claimed is:

1. A computer-implemented method for presenting content data associated with a webpage from a network, wherein a plurality of content data sources are provided in content-related information of related content data associated with the webpage from the network for the same content, comprising:
    based on the content-related information, determining, by one or more processors of a computer system, a Multipurpose Internet Mail Extensions (MIME) type for each of the plurality of content data sources;
    setting, by the one or more processors, a weighted value for each of the plurality of content data sources based on the content-related information, comprising:
        retrieving, by the one or more processors, at least one pre-set weighted values table, wherein the at least one pre-set weighted values table indicates at least one weighted value for the content data source of each MIME type, wherein the at least one pre-set weighted values table comprises a general purpose pre-set weighted values table indicating a first weight value for each MIME type and an operation system specific pre-set weighted values table indicating a second weight value for each MIME type based on an operation system of the computer system for presenting the content data; and
        determining, by the one or more processors, a corresponding weighted value for each content data source based on the at least one pre-set weighted values table; and
    based on the corresponding weighted value of each content data source, selecting, by the one or more processors, a content data source for presenting the content data of the webpage on a display of the computer system.

2. The computer-implemented method according to claim 1, wherein determining the MIME type for each of the plurality of content data sources comprises:
    in the case when the MIME type of the content data source is provided in the content-related information, extracting, by the one or more processors, the MIME type of the content data source from the content-related information; and
    in the case when the MIME type of the content data source is not provided in the content-related information, determining, by the one or more processors, the MIME type of the content data source based on a Uniform Resource Locator (URL) of the content data source provided in the content-related information.

3. The computer-implemented method according to claim 2, wherein determining the MIME type of the content data source based on the URL of the content data source comprises:
    in the case when the URL is a data type URL, extracting, by the one or more processors, the MIME type from the URL; and
    in the case when the URL is not a data type URL, on the basis of a filename extension contained in the URL, determining, by the one or more processors, the MIME type of the content data source according to a table of corresponding relationship between filename extension and MIME type.

4. The computer-implemented method according to claim 1, wherein selecting the content data source for presenting the content data comprises:
    selecting, by the one or more processors, a content data source with a highest weight value among the plurality of content data sources for presenting the content data; and
    determining that an error occurs during presenting the content data based on the content data source with the highest weight value;
    determining, by the one or more processors, one or more content data sources that are free of error; and
    selecting, by the one or more processors, a content data source with a second highest weight value among the one or more content data sources for presenting the content data.

5. The computer-implemented method according to claim 4, further comprising:
    in response to determining that the error occurs when presenting the content data, recording, by the one or more processors, a presenting time point of the content data when the error occurs; and
    subsequent to selecting, by the one or more processors, the content data source with the second highest weight value for presenting the content data; jumping to the presenting time point in the newly selected content data source for continuing presenting the content data.

6. A terminal comprising a processor and a memory storing processor executable instructions, wherein a plurality of content data sources are provided in content-related information of related content data associated with a webpage from a network for the same content, the memory and processor executable instructions being configured to, with the processor, cause the terminal to:
    based on the content-related information, determine a Multipurpose Internet Mail Extensions (MIME) type for each of the plurality of content data sources;
    set a weighted value for each of the plurality of content data sources based on the content-related information, comprising:
        retrieve at least one pre-set weighted values table, wherein the at least one pre-set weighted values table indicates at least one weighted value for the content data source of each MIME type, wherein the at least one pre-set weighted values table comprises a general purpose pre-set weighted values table indicating a first weight value for each MIME type and an operation system specific pre-set weighted values table indicating a second weight value for each MIME type based on an operation system of the terminal; and
        determine a corresponding weighted value for each content data source based on the at least one pre-set weighted values table; and
    based on the corresponding weighted value of each content data source, select a content data source for presenting the content data of the webpage.

7. The terminal according to claim 6, wherein determining the MIME type for each of the plurality of content data sources causes the terminal to:
    in the case when the MIME type of the content data source is provided in the content-related information, extract the MIME type of the content data source from the content-related information; and in the case when the MIME type of the content data source is not provided in the content-related information, determine the MIME type of the content data source based on an Uniform Resource Locator (URL) of the content data source provided in the content-related information.

8. The terminal according to claim 7, wherein determining the MIME type of the content data source based on the URL of the content data source causes the terminal to:
in the case when the URL is a data type URL, extract the MIME type from the URL; and
in the case when the URL is not a data type URL, on the basis of a filename extension contained in the URL, determine the MIME type of the content data source according to a table of corresponding relationship between filename extension and MIME type.

9. The terminal according to claim 6, wherein selecting the content data source for presenting the content data causes the terminal to:
select a content data source with a highest weight value among the plurality of content data sources for presenting the content data; and
determine that an error occurs during presenting the content data based on the content data source with the highest weight value;
determine one or more content data sources that are free of error; and
select a content data source with a second highest weight value among the one or more content data sources for presenting the content data.

10. The terminal according to claim 9, wherein the memory and the processor executable instructions being configured to, with the processor, cause the terminal to:
in response to determining that the error occurs when presenting the content data, record a presenting time point of the content data when the error occurs;
subsequent to selecting the content data source for presenting the content data, jump to the presenting time point for continuing presenting the content data.

11. A non-transitory computer-readable storage medium for presenting content data associated with a webpage from a network, wherein a plurality of content data sources are provided in content-related information of related content data associated with the webpage from the network for the same content, the non-transitory computer-readable storage medium storing computer-executable instructions, wherein a processor of a computer executing the computer-executable instructions to cause the computer to:
based on the content-related information, determine a Multipurpose Internet Mail Extensions (MIME) type for each of the plurality of content data sources;
set a weighted value for each of the plurality of content data sources based on the content-related information, comprising:
retrieve at least one pre-set weighted values table, wherein the at least one pre-set weighted values table indicates at least one weighted value for the content data source of each MIME type, wherein the at least one pre-set weighted values table comprises a general purpose pre-set weighted values table indicating a first weight value for each MIME type and an operation system specific pre-set weighted values table indicating a second weight value for each MIME type based on an operation system of the computer; and
determine a corresponding weighted value for each content data source based on the at least one pre-set weighted values table; and
based on the corresponding weighted value of each content data source, select a content data source for presenting the content data of the webpage on a display of the computer.

12. The non-transitory computer-readable storage medium according to claim 11, wherein the processor executing the computer-executable instructions to cause the computer to:
in the case when the MIME type of the content data source is provided in the content-related information, extract the MIME type of the content data source from the content-related information; and
in the case when the MIME type of the content data source is not provided in the content-related information, determine the MIME type of the content data source based on a URL of the content data source provided in the content-related information.

13. The non-transitory computer-readable storage medium according to claim 12, wherein the processor executing the computer-executable instructions to cause the computer to:
in the case when the URL is a data type URL, extract the MIME type from the URL;
in the case when the URL is not a data type URL, on the basis of a filename extension contained in the URL, determine the MIME type of the content data source according to a table of corresponding relationship between filename extension and MIME type.

14. The non-transitory computer-readable storage medium according to claim 11, wherein the processor executing the computer-executable instructions to cause the computer to:
select a content data source with a highest weight value among the plurality of content data sources for presenting the content data; and
determine that an error occurs during presenting the content data based on the content data source with the highest weight value;
determine one or more content data sources that are free of error; and
select a content data source with a second highest weight value among the one or more content data sources for presenting the content data.

15. The non-transitory computer-readable storage medium according to claim 14, wherein the processor executing the computer-executable instructions to cause the computer to:
in response to determining that the error occurs, record a presenting time point of content data when an error occurs during presenting the content data; and
jump to the presenting time point for continuing presenting the content data with the content data source with the second highest weight value.

* * * * *